US008469852B2

(12) United States Patent
Gianone et al.

(10) Patent No.: US 8,469,852 B2
(45) Date of Patent: Jun. 25, 2013

(54) TRANSMISSION SYSTEM

(75) Inventors: Roberto Gianone, Barengo (IT); Chiara Cesari, Novara (IT); Marco Bassi, Novate Milaese (IT); Marco Fratelli, Vigevano (IT); Clive Harrup, Bedfordshire (GB); Bradley Arnold, Birmingham, MI (US)

(73) Assignee: Meritor Heavy Vehicle Braking Systems (UK) Limited, Monmouthshire (GB)

( * ) Notice: Subject to any disclaimer, the term of this patent is extended or adjusted under 35 U.S.C. 154(b) by 51 days.

(21) Appl. No.: 13/257,036

(22) PCT Filed: Mar. 15, 2010

(86) PCT No.: PCT/IB2010/051106
§ 371 (c)(1),
(2), (4) Date: Dec. 2, 2011

(87) PCT Pub. No.: WO2010/106482
PCT Pub. Date: Sep. 23, 2010

(65) Prior Publication Data
US 2012/0142476 A1    Jun. 7, 2012

(30) Foreign Application Priority Data
Mar. 17, 2009    (EP) .................................... 09155395

(51) Int. Cl.
*F16H 57/04*    (2010.01)

(52) U.S. Cl.
USPC ......................................................... 475/160

(58) Field of Classification Search
USPC ............................................................ 74/607
See application file for complete search history.

(56) References Cited

U.S. PATENT DOCUMENTS

| 3,182,527 | A | * | 5/1965 | Bryan ........................... 475/160 |
| 3,625,310 | A | * | 12/1971 | Herrick ........................ 184/6.12 |
| 4,018,097 | A | * | 4/1977 | Ross ............................... 74/467 |
| 4,733,578 | A | * | 3/1988 | Glaze et al. ................... 475/246 |
| 4,865,250 | A | | 9/1989 | Zaveri et al. |
| 5,099,715 | A | | 3/1992 | Baiker |
| 5,316,106 | A | | 5/1994 | Baedke |
| 5,505,112 | A | * | 4/1996 | Gee ............................ 74/606 R |
| 5,540,300 | A | * | 7/1996 | Downs et al. ................ 184/11.2 |
| 5,669,479 | A | | 9/1997 | Matsufuji |
| 5,799,540 | A | | 9/1998 | Diehl et al. |
| 5,839,327 | A | * | 11/1998 | Gage ............................. 74/607 |
| 7,059,215 | B1 | | 6/2006 | Ziech |
| 7,374,507 | B2 | * | 5/2008 | Corless et al. ................ 475/159 |

(Continued)

FOREIGN PATENT DOCUMENTS

DE    10245791 A1    4/2004
EP    067639 A    12/1982

OTHER PUBLICATIONS

International Search Report dated Sep. 17, 2010.

*Primary Examiner* — Dirk Wright
(74) *Attorney, Agent, or Firm* — Brooks Kushman P.C.

(57) ABSTRACT

A transmission system includes a housing having a sump. A crown wheel and pinion are positioned within the housing. The transmission system further includes a reservoir having an inlet system and an outlet system. Rotation of the crown wheel causes the oil to be transferred from the sump to the reservoir via the inlet system, and the outlet system allows oil to pass from the reservoir to the sump.

20 Claims, 10 Drawing Sheets

U.S. PATENT DOCUMENTS 8,328,668 B2 * 12/2012 Ariga et al. ................ 474/1
8,360,915 B2 * 1/2013 Gianone et al. ............ 475/160

2006/0063633 A1 3/2006 Turner et al.
2007/0169583 A1 7/2007 Reis et al.

* cited by examiner

TRANSMISSION SYSTEM

RELATED APPLICATION

This is the U.S. national phase of PCT/IB2010/051106 filed 15 Mar. 2010, which claims priority to EP 09155395.8, filed 17 Mar. 2009.

TECHNICAL FIELD

The present invention relates to a transmission system, in particular a transmission system including a crown wheel and pinion, especially a transmission system including a crown wheel and pinion in an axle housing.

BACKGROUND OF THE INVENTION

A driven axle for automotive vehicles is known whereby a drive shaft aligned generally longitudinally relative to the vehicle drives a pinion which is in meshing engagement with a crown wheel in an axle housing. The crown wheel drives a right hand drive shaft connected to a right hand wheel and also drives a left hand drive shaft connected to a left hand wheel, thereby propelling the vehicle. Typically the crown wheel will drive the right and left hand drive shafts via a differential assembly.

In order to ensure longevity of the crown wheel and pinion gears, it is important to ensure that the pinion is positioned in the correct longitudinal position relative to the crown wheel, and it is also important to ensure that the crown wheel is positioned at the correct lateral position relative to the pinion. For these reasons, typically the pinion will be shimmed to ensure it is in its correct longitudinal position. Typically, screw thread adjustments can be made to move the crown wheel laterally to ensure that it is also in its correct lateral position. In view of the necessary accuracy required for positioning of the crown wheel and the pinion, these components are typically mounted on a carrier as a sub-assembly. The correct positioning of the crown wheel and pinion can therefore be achieved on the carrier remotely from the associated vehicle, for example on a workbench. Once the settings have been correctly carried out, the sub-assembly of the carrier, crown wheel and pinion can then be fitted to the vehicle. By providing a carrier sub-assembly including a crown wheel and pinion, the crown wheel and pinion can be correctly positioned relative to each other in a clean environment, and then the carrier can be fitted to the vehicle with the fitting taking place in a traditionally less clean environment, typically beneath the vehicle where road dirt and the like will have accumulated.

In most vehicles the carrier sub-assembly will include a differential assembly, and as such the carrier is known as a "differential carrier".

Such carriers or differential carriers will include a generally circular flange. The carrier sub-assembly will be assembled into the axle through a generally circular hole in the axle. The crown wheel, pinion and differential (if fitted) will pass through the hole in the axle and the carrier flange will then effectively close off the hole. Typically a series of bolts will fix the carrier flange to the axle.

Oil is provided in the axle housing for lubricating and cooling the crown wheel, pinion, differential gears and associated bearings. However, the rotation of the crown wheel, pinion and differential housing in this oil leads to power losses due to oil churning, thereby increasing the overall fuel consumption of the vehicle.

SUMMARY OF THE INVENTION

A transmission system includes a housing having a sump. A crown wheel and pinion are positioned in the housing. The transmission system further includes a reservoir having an inlet system and an outlet system. Rotation of the crown wheel causes the oil to be transferred from the sump to the reservoir via the inlet system, and the outlet system allows oil to pass from the reservoir to the sump.

Advantageously, storing of oil in the reservoir means that that stored oil can no longer be churned by the crown wheel, pinion, etc., and as such churning losses are reduced.

The housing may contain the reservoir. Advantageously, by positioning the reservoir in the housing, the reservoir is protected from the environment. Furthermore, it is not necessary to provide space outside of the housing for the reservoir.

The reservoir may be C-shaped. Advantageously, the reservoir can be fitted around the differential and/or around a drive shaft. One arm of the C-shaped reservoir may be positioned above the differential and/or drive shaft, while another arm of the C-shaped reservoir may be positioned below the differential and/or drive shaft.

The reservoir may include a wall that faces teeth of the crown wheel.

A lower portion of the reservoir may be positioned in the sump. Thus, by positioning part of the reservoir in the sump, and then partially or fully filling the reservoir results in lubricant being positioned in the reservoir in the sump and therefore the oil cannot be churned. This reduces churning losses as positioning part of the reservoir within the sump reduces the volume of churnable oil in the sump.

The housing may be defined by an axle housing having an opening sized to receive the crown wheel and a carrier upon which the crown wheel and pinion are mounted, the carrier having a flange sized to substantially close the opening.

The reservoir may be mounted on the carrier. When the reservoir is mounted on the carrier, it is possible to perform this mounting operation away from the associated axle, typically in a clean environment such as on a workbench. Thus, the reservoir system and any associated inlets, outlets, adjustable outlets, motors or flexible shafts or the like can be set up and tested away from the axle. Once the reservoir and its associated system is fully functional and tested, the carrier sub-assembly can be mounted onto the axle.

The outlet system may be selectively variable to vary the amount of lubricant flowing from the reservoir to the sump. Advantageously, depending upon the working conditions of the associated vehicle, by reducing the amount of oil flow from the reservoir, the reservoir will progressively fill, thereby reducing churching losses. Alternatively, when conditions require more oil in the sump, the opening in the reservoir can be opened thereby allowing more oil to flow from the reservoir into the sump, thereby better lubricating the crown wheel, pinion, etcetera.

The outlet system may be varied to substantially prevent any lubricant flowing from the reservoir to the sump. Advantageously, by preventing oil flowing from the reservoir to the sump, the reservoir will progressively fill and the sump will progressively empty to a particular level. This reduces churning losses.

The outlet system may comprise an orifice and a closure moveable to vary the amount of lubricant flowing from the reservoir to the sump.

The closure may be linearly slideable.

The closure may be rotatable to close the orifice.

The outlet system may include a permanent metered orifice. Advantageously, by providing a permanent meted orifice in the event of a malfunction of the outlet system of the reservoir, a continuous supply of lubricant can be fed from the reservoir to the sump. Typically, the continuous supply may be relatively small. Such a system will ensure a continuous supply of oil to the sump.

The metered orifice may be at a lower portion of the reservoir.

The metered orifice may be in the closure.

The inlet system may include a scoop.

The scoop may be positioned at the top of the crown wheel.

The opening of the housing may be generally circular and may include an upper notch sized to receive the crown wheel, the scoop being positioned within the upper notch.

Typically the diameter of the crown wheel is larger than the diameter of the opening in the axle housing. It is for this reason that a notch is provided so that when the carrier (or differential carrier) is assembled onto the axle the crown wheel can pass through the opening. By positioning the scoop within the upper notch, the scoop is positioned in an area where it will readily capture oil spun off from the crown wheel. The scoop is further positioned at a pre-existing notch which is necessary in order for the crown wheel to be assembled into the axle.

The crown wheel may include crown wheel teeth defining a crown wheel tooth plane. The reservoir has a generally vertical wall facing the crown wheel teeth, which defines a plane of the reservoir wall. The scoop projects into the space defined between the crown wheel tooth plane and the plane of the reservoir wall.

As such, the scoop is positioned where it will readily receive lubricant thrown off the crown wheel, and hence cause the reservoir to fill relatively quickly.

The transmission system may include lubricant, in particular liquid lubricant such as oil, wherein the amount of lubricant within the housing is greater than the capacity of the reservoir.

Where the amount of oil in the housing is greater than the capacity of the reservoir, even if the reservoir is filled with oil, there will always remain an excess of oil for lubrication of the crown wheel, pinion, etcetera.

Where the transmission system includes a closure which is rotatable to close the orifice, the closure may be rotatable about a first axis by a flexible drive. The flexible drive has an end remote from the closure that is rotatable about a second axis. The first axis is different from the second axis. Said end may be rotatable by an actuator. The actuator may be mounted on a carrier, such as a differential carrier. The carrier may include a recess for receiving at least a part of the actuator.

A method of operating a transmission system is also provided, wherein the housing is defined by an axle housing having axle housing arms and which includes lubricant. The method comprises the steps of allowing the outlet system to equalize the lubricant level in the reservoir and the sump, operating the transmission system so that the lubricant level in the reservoir rises to a level above a lower edge of the axle housing arm, and alternatively operating the transmission system so the lubricant level in the reservoir rises to a level above an upper edge of the axle housing arm.

Providing a portion of the reservoir above the level of the lower edge of the axle housing arm, or providing a portion of the reservoir above the upper edge of the axle housing arm, creates the ability to store oil above these two levels without that oil passing into the axle housing arms and travelling toward the wheels.

A method of operating a transmission system is provided, wherein the transmission system includes lubricant. The method comprises the steps of allowing the outlet system to equalize the lubricant level in the reservoir and the sump, and operating the transmission system to fill the reservoir.

BRIEF DESCRIPTION OF THE DRAWINGS

The invention will now be described, by way of example only, with respect to the accompanying drawings in which.

DETAILED DESCRIPTION

With reference to FIGS. 1 to 5 there is shown a transmission system 10 having an axle housing 12 with a sump 14. Rotatable in the axle housing is a crown wheel 16 which is driven by a pinion 28.

The axle housing 12 has two axle housing arms 12A and 12B which receive drive shafts (not shown). Pinion 28 is driven by a central drive shaft (not shown) and has teeth which engage teeth 16C on the crown wheel 16. The crown wheel is attached to a differential assembly 46. The crown wheel is positioned on the left side (when viewing FIG. 4) of the differential assembly 46 and the teeth 16C face towards the pinion 28 and arm 12A and therefore face away from arm 12B.

Figure 5:
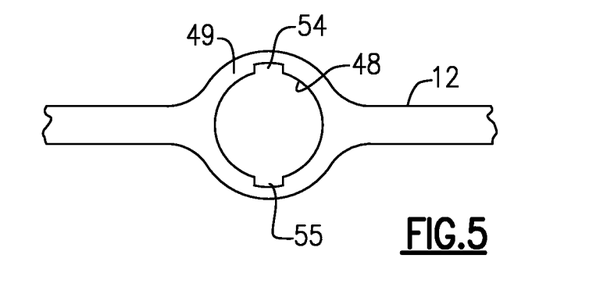
FIG. 5 is a schematic front view of the axle housing of FIG. 4.

The axle housing 12 includes a generally circular aperture 48 defined by a housing flange 49 on a front face (see FIG. 5).

A carrier 50 includes a carrier flange 52 which, when bolted to the axle housing 12 against the housing flange 49, substantially closes the aperture 48. The axle housing and carrier thus define a housing 13.

Mounted on the carrier is the pinion 28, crown wheel 16, differential assembly 46, together with associated bearings in a manner known in the art.

A right hand drive shaft (not shown) extends from the differential assembly 46 through the axle housing arm 12A and a left hand drive shaft (not shown) extends from the differential assembly 46 through the axle housing arm 12B.

The housing flange 49 has an upper notch 54 and a lower notch 55. The carrier flange 52 has an upper notch 56 and a lower notch 57. The upper and lower notches 56 and 57 provide clearance between the crown wheel 16 and the flange 52. When assembled, the upper and lower notches 56 and 57 of the carrier flange 52 are aligned with the upper and lower notches 54 and 55 of the housing flange 49. The upper and lower notches 54 and 55 of the housing flange 49 provide clearance between the crown wheel 16 and the housing flange 49.

The teeth on the crown wheel 16 together with the teeth on the pinion 28 together define a particular gear ratio of the combined crown wheel and pinion. In an alternate embodiment, a crown wheel and pinion may be fitted which have a higher overall ratio. In an alternative embodiment, a crown wheel and pinion may be fitted which have a lower overall gear ratio.

Figure 4:
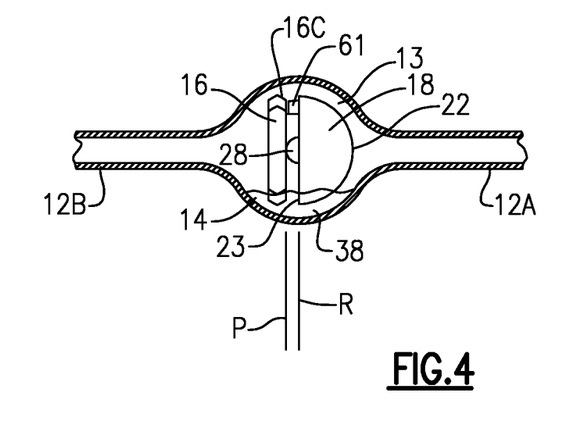
FIG. 4 is a schematic rear section view of part of the transmission system of FIG. 1 including an axle housing.

As shown in FIG. 4, the teeth 16C define a plane P. A crown wheel and pinion with a higher gear ratio will have a corresponding plane P displaced to the left when viewing FIG. 4. A crown wheel and pinion with a lower gear ratio will have a corresponding plane P displaced to the right when viewing FIG. 4. Accordingly, the upper and lower notches 54 and 55 of the housing flange 49 and upper and lower notches 56 and 57 of the carrier flange 52 must be sized to accommodate all envisioned gear ratios for a particular axle housing 12.

The transmission system 10 also includes a reservoir 18.

Figure 2:
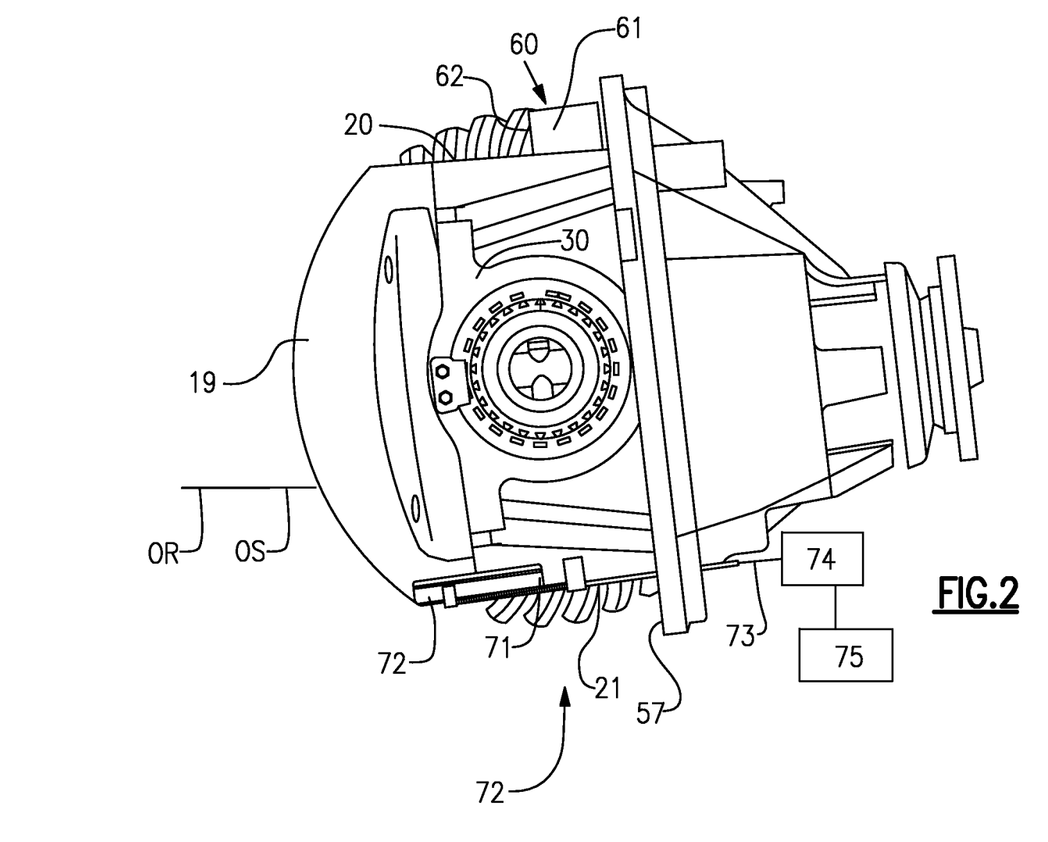
FIG. 2 is a side view of FIG. 1 with an outlet of a reservoir shown in an open position.

When viewing FIG. 2, reservoir 18 is generally C-shaped having a main body portion 19, a forwardly projecting upper arm 20 and a forwardly projecting lower arm 21.

For the purposes of explanation, the axle housing 12 is assumed to be a rear axle housing of a vehicle, and as such the pinion is positioned in front of the differential. Under circumstances where the axle housing is a front axle housing, typically the differential will be positioned in front of the pinion.

The upper arm 20 includes an inlet system 60 and the lower arm 21 includes an outlet system 70. The main body portion 19 has an arcuate surface 22 (FIG. 4) sized to pass through the generally circular aperture 48. The main body portion also includes a generally vertical wall 23 which faces teeth 16C. The wall 23 defines a plane R which is spaced from plane P. The wall 23 is positioned such that the teeth of the crown wheel 16 having the lowest gear ratio (i.e. the teeth of the crown wheel where plane P is closest to plane R) will nevertheless still provide a clearance between the teeth and the wall 23. The main body portion 19 also has a contoured surface 24 (FIG. 1) shaped similarly to the adjacent internal surface of the rear of the axle housing.

Fixings (such as bolts 25) secure the reservoir to a right hand differential bearing housing 30 (FIG. 2). In this case the differential bearing housing 30 is formed integrally with the carrier 50.

The inlet system 60 is in the form of a scoop 61 which lies between the planes P and R. The scoop 61 is open on a rearwardly facing mouth portion 62 and also on a side face 63 which faces the teeth 16C. As the crown wheel 16 rotates in a clockwise direction when the vehicle is moving in a forward direction (when viewing FIG. 2) a particular tooth 16C will pass through the sump 14 thereby dipping into a liquid lubricant, in this case oil 38, and this oil will adhere to the tooth and then be spun off due to centrifugal force. Some of the oil will be spun into the rearward facing mouth portion 62 of the scoop. That oil will then pass into the upper arm 20 and then into the main body portion 19 of the reservoir, as will be further described below.

Figure 3:
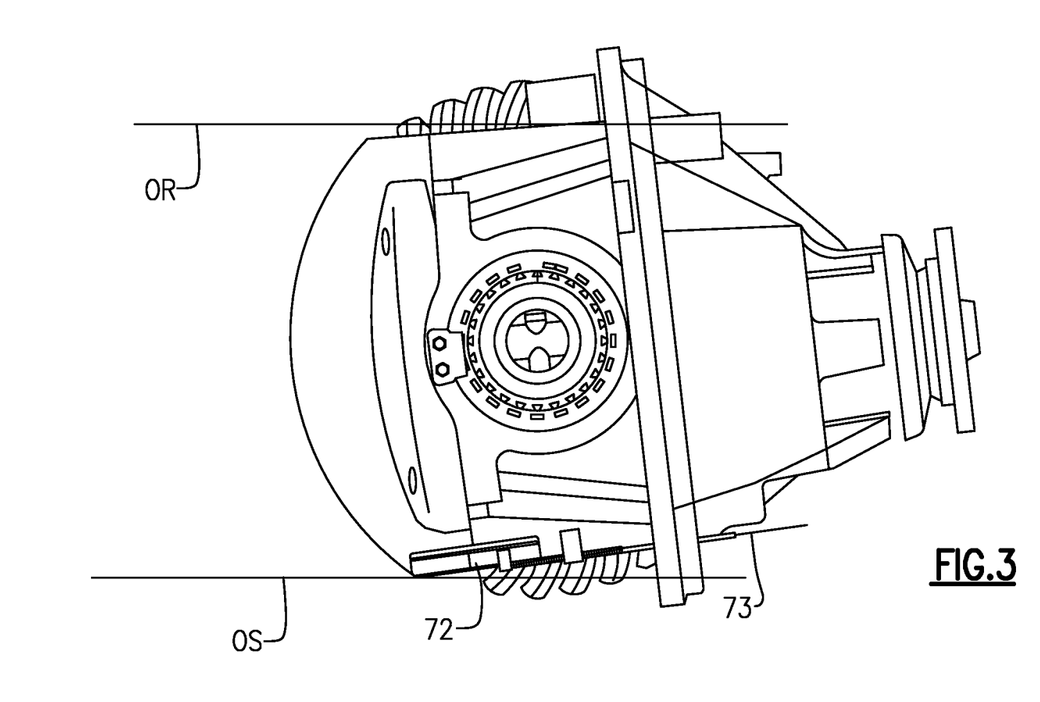
FIG. 3 is a side view of FIG. 1 with an outlet of a reservoir shown in a closed position.

The outlet system 70 comprises an orifice 71 in a lower portion of the reservoir. A closure 72 can be moved to a rearward position as shown in FIG. 2 thereby exposing the orifice 71 and allowing oil to drain from the reservoir. Alternatively, the closure 72 can be slid to a forwards position, as shown in FIG. 3, thereby closing the orifice 71. A rod 73 moves the closure 72 and an actuator 74 (shown schematically) operates to move the rod 73.

The reservoir 18 can be made from various materials including plastic materials.

In one embodiment, the scoop 61 is sized so that the side face 63 lies close to the teeth of the crown wheel 16 having the highest gear ratio (i.e. when the plane P is displaced to the left when viewing FIG. 4). Depending upon the particular gear ratio used, it is then possible to modify the scoop 61 e.g. by trimming a portion so that the side face 63 of the trimmed scoop still lies close to the teeth of the crown wheel. Note that only a small trimming operation is required since the wall 23 is positioned such that there is a clearance between the wall 23 and the crown wheel 16 having the lowest gear ratio (i.e. where plane P is closest to plane R).

A controller, such as an ECU 75 controls the actuator 74 as will be further described below. The housing holds the oil 38.

Figure 1:
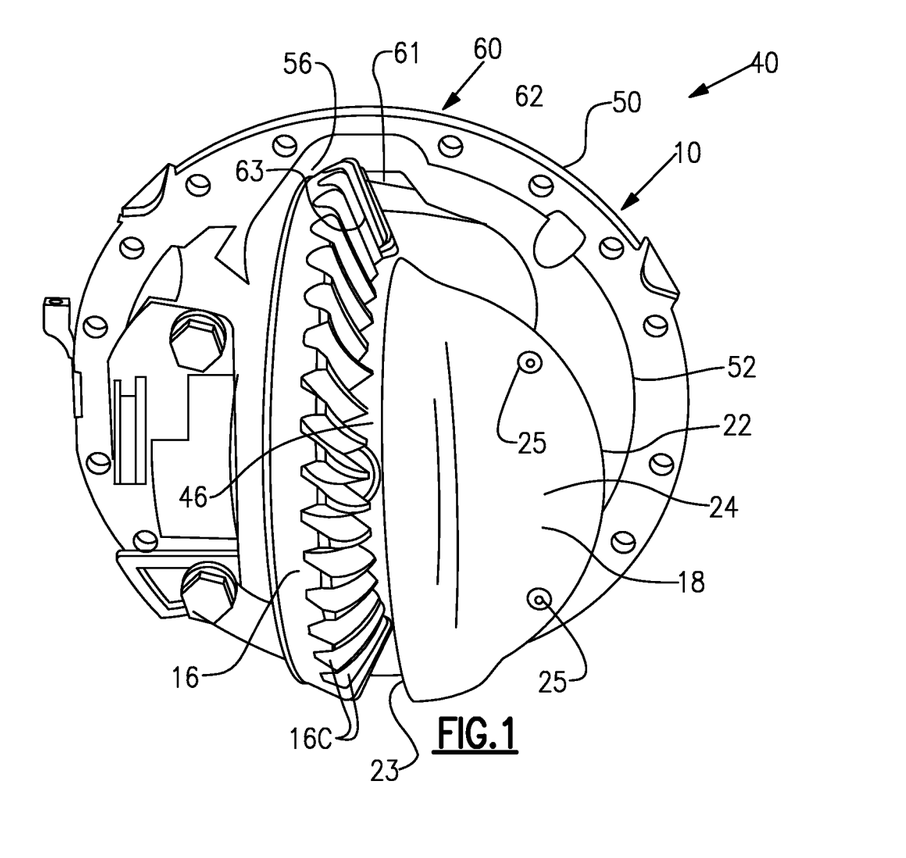
FIG. 1 is a rear isometric view of part of a transmission system according to the present invention.

The components shown in FIGS. 1 and 3 define a carrier sub-assembly, in this case a differential carrier sub-assembly 40. The primary components of the sub-assembly are the carrier 50, the pinion 28, the crown wheel 16 and the reservoir 18. In this case the sub-assembly includes the differential assembly 46. Such a sub-assembly allows all the components shown in FIGS. 1 and 3 to be assembled and tested in a clean environment prior to fitting to the axle.

Operation of a device is as follows.

Starting with the associated vehicle stationary and the orifice 71 open, as shown in FIG. 2, the oil level in the reservoir OR is the same as the oil level in the sump OS (FIG. 3). When the vehicle drives off, oil is picked up by teeth 16C and some of the oil is centrifuged into the scoop 61. It then falls, under gravity rearwardly along the upper arm 20 and into the main body portion 19 of the reservoir. However, since the orifice 71 is fully open, then any oil being transferred into the scoop 61 from the sump is immediately replaced by oil draining out of the reservoir. As such, oil continues to circulate through the reservoir maintaining the oil level in the sump at substantially the position OS shown in FIG. 2, i.e. the position when the vehicle is stationary.

Under these circumstances there is a plentiful supply of oil to the crown wheel, pinion, differential and bearings as is required under arduous driving conditions, e.g. when the crown wheel is transmitting high power and torque such as when the associated vehicle is a lorry which is fully laden and is ascending a hill. Thus, under these conditions churning power losses are relatively high, but nevertheless a plentiful supply of oil to the crown wheel and pinion is provided to ensure no damage occurs.

However, when driving conditions change and the crown wheel 16 is only required to transmit low power and low torque, then the ECU 75 will instruct the actuator 74 to move the closure 72 so as to close the orifice 71. Under these circumstances oil entering the scoop 61 can no longer drain out of the outlet system 70 and the reservoir will progressively fill with oil, thereby reducing the level of oil in the sump. Ultimately, the reservoir will fill completely and the oil level in the reservoir will become OR, as shown in FIG. 3 and the corresponding oil level in the sump will become OS, as shown in FIG. 3. As will be appreciated from FIG. 3 the oil level OS is still higher than the lowest point through which part of the teeth 16C rotate. Under these circumstances the oil churning power losses are reduced. However, since only low power and low torque is being transmitted by the crown wheel, then the lowered oil level OS is still sufficient to properly lubricate components and ensure no damage occurs. An example of when the crown wheel transmits relatively low power and relatively low torque would be when the associated vehicle is a lorry carrying no load and driving along a flat hard road surface.

The ECU 75 is capable of determining operating conditions which require more oil in the sump and operating conditions which only require a lower level of oil in the sump. Thus, the ECU 75 could receive a signal from a torque meter.

Alternatively, the ECU 75 could receive a signal from an accelerator pedal position sensor. Alternatively, the running condition of the engine (especially the engine RPM and the fuel flow) can determine the power and torque output from the engine. The ECU 75 could be connected to a temperature sensor which senses the temperature of oil 38. An appropriate algorithm will determine when the orifice 71 should be open and when it can be closed by the closure 72.

In one embodiment, the ECU 75 could instruct the actuator 74 to fully close and fully open the closure 72 as appropriate, i.e. the closure has only two positions. A more sophisticated system would have the ECU position the closure either fully open, or fully closed, or at one of several intermediate positions as appropriate.

Under certain circumstances it is advantageous to have a metered bleed system, which permanently allows a limited oil flow from the reservoir to the sump. In its simplest form, the metered bleed system could be a relatively small hole in the bottom of the reservoir. Under high speed running conditions the crown wheel would transfer more oil from the sump to the scoop than the metered bleed system returned from the reservoir to the sump. Under these circumstances the oil level in the sump would fall. However, under lower running speed conditions, the crown wheel would transfer a correspondingly smaller flow rate of oil to the scoop and hence the oil level in the sump would progressively rise. When the vehicle comes to a rest the metered bleed would ensure the oil level in the sump is balanced with the level in the reservoir.

The metered bleed could be used in conjunction with, i.e. in addition to orifice 71 and closure 72. When the metered bleed is being used in conjunction with orifices 71, as mentioned above, the metered bleed system will be a relatively small hole in the bottom of the reservoir, alternatively the metered bleed system could be a relatively small hole in the closure 72.

Note that the metered bleed could be used in place of orifice 71 and closure 72.

As shown in FIG. 3, the reservoir is completely full and there is still an amount of oil in the sump. Therefore the total amount of oil in the housing 13 is greater than the capacity of the reservoir. Ensuring a minimum amount of oil in the housing 13 where that minimum is greater than the capacity of the reservoir will ensure a minimum oil level (OS of FIG. 3) in the sump irrespective of the running conditions of the associated vehicle.

As shown in FIG. 2, the oil level OR and oil level OS is below a lower edge of the axle housing arms 12A and 12B (FIG. 4). This is a typical oil level of known axle assemblies. The oil level is set at this height to ensure the oil does not pass into the axle housing arms themselves.

Providing a reservoir in housing 13 allows the oil level in that reservoir to be at a level above the axle housing arm without any oil passing into the axle housing arm. Thus, the reservoir 18 provides a system whereby oil can be held at a level higher than the axle housing arm when not required to lubricate the crown wheel when the crown wheel is transmitting relatively low torque and low power.

Figure 6:
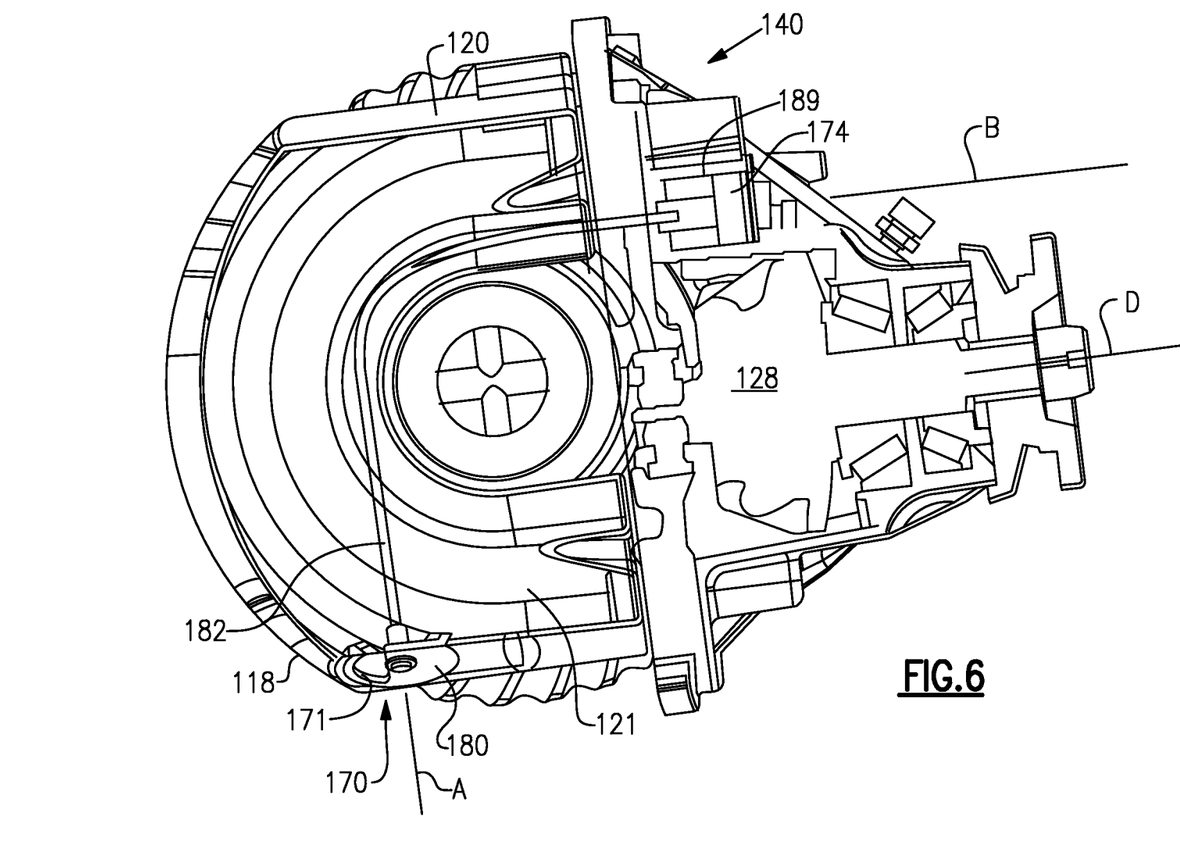
FIG. 6 is a side section view of another embodiment of a transmission system according to the present invention.

With reference to FIGS. 6 to 9 there is shown a crown wheel and pinion carrier 150 with components that fulfill the same function as those of carrier 50, and which are correspondingly labeled 100 greater. In this case, the orifice 171 is arcuate and is formed in boss 180. Boss 180 is non-rotatably attached to the reservoir 118. The closure 172 (FIG. 9) is in the form of a disc having an arcuate hole 181 similar in size and shape to the orifice 172. The closure 171 is rotatable from a closed position (as shown in FIG. 6) wherein the arcuate hole 181 is misaligned with the orifice 171, to an open position where the arcuate hole 181 is aligned with the orifice 171. In the open position, oil within the reservoir can flow through the orifice 171 and in the closed position oil cannot flow through the orifice 171.

The carrier subassembly 140 as shown in FIG. 6 can be assembled into the axle housing 12.

Figure 7:
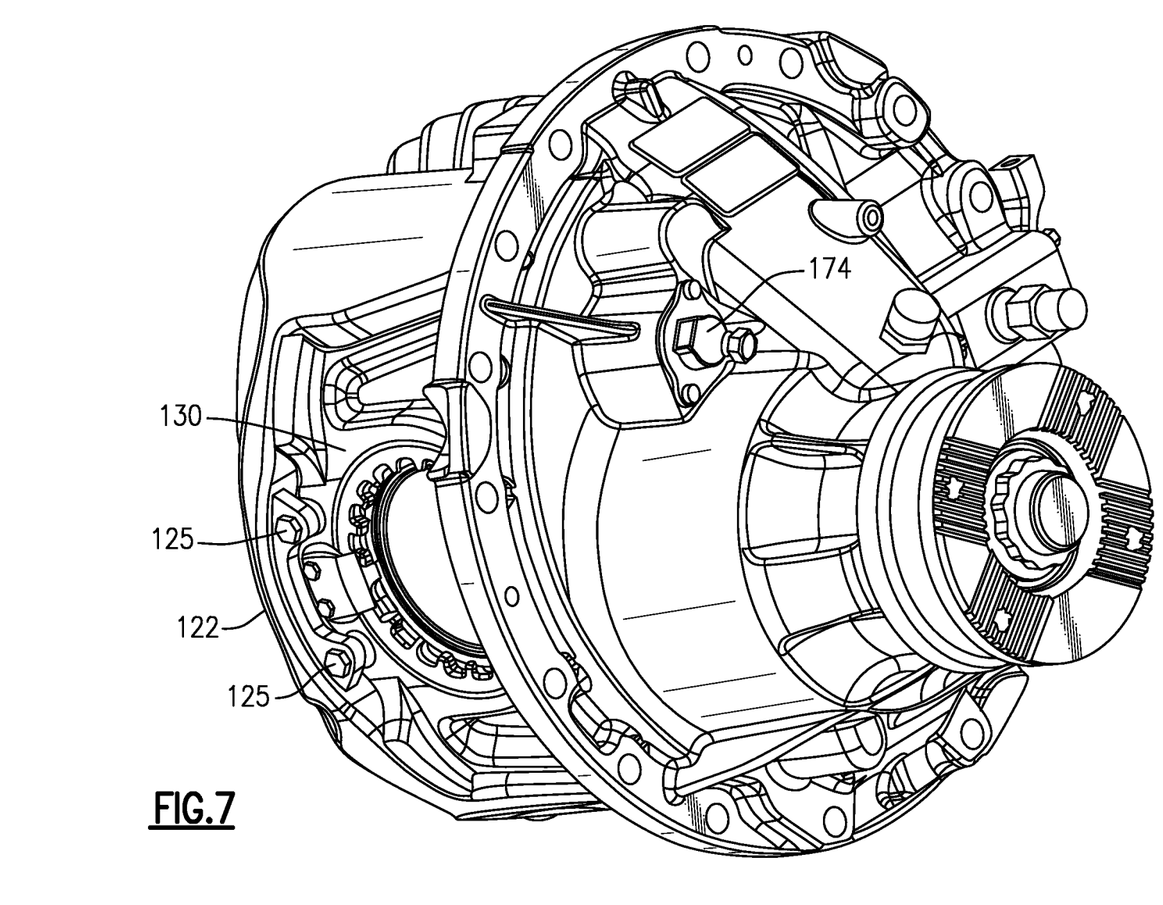
FIG. 7 is a front isometric view of FIG. 6.
Figure 8:
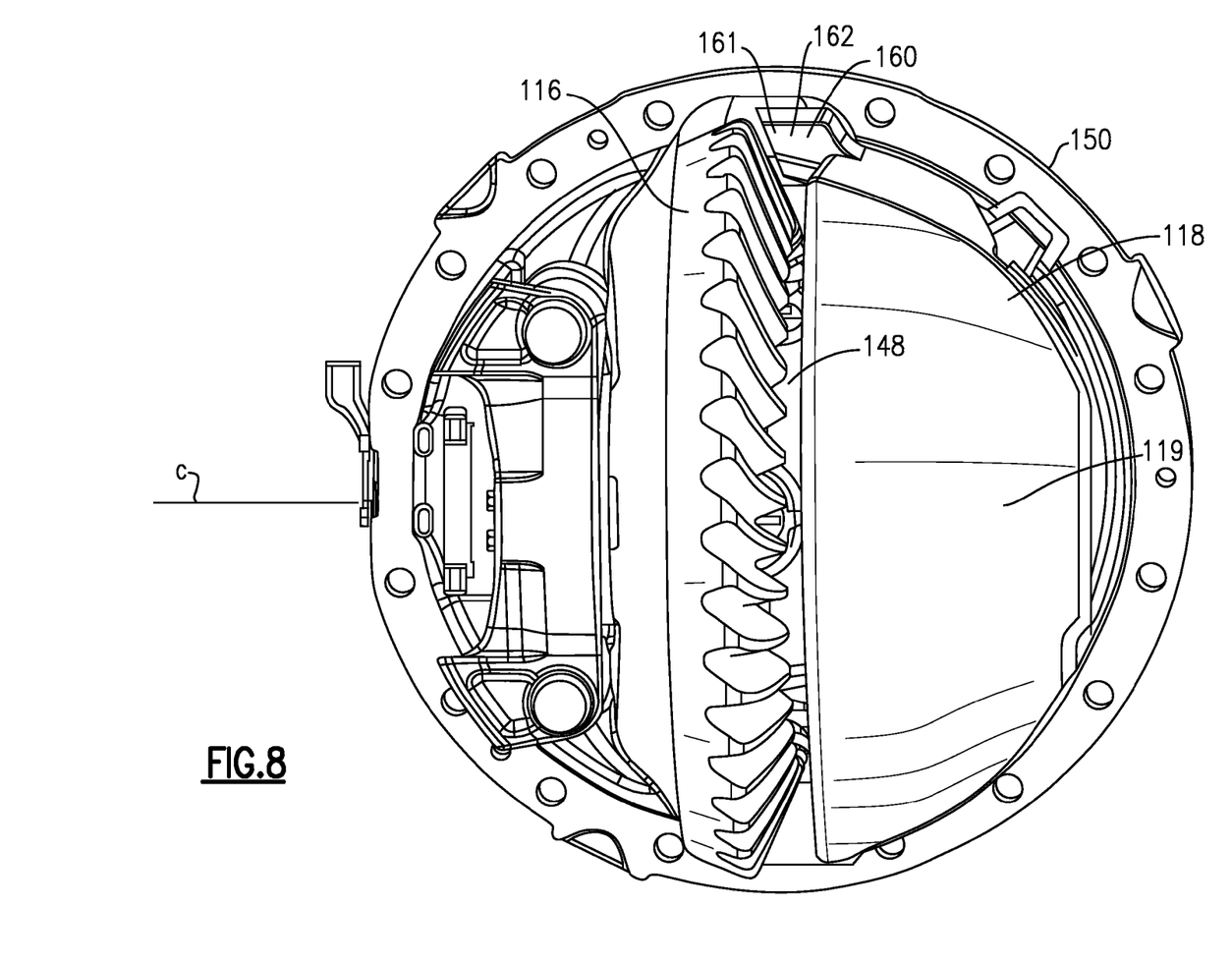
FIG. 8 is a side view of FIG. 6.
Figure 9:
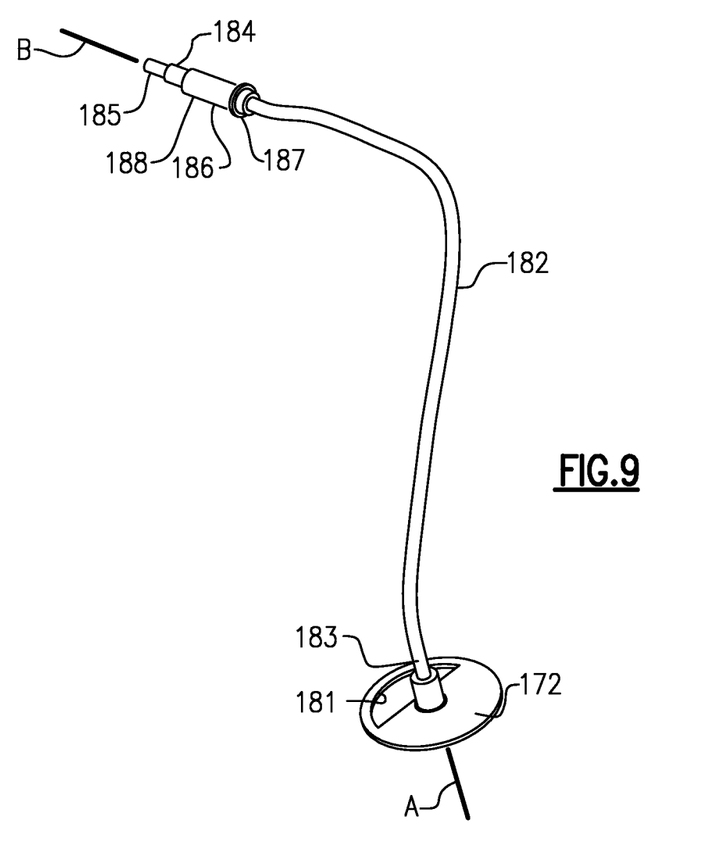
FIG. 9 is an isometric view of a flexible drive as used in the embodiment shown in FIG. 6.

The closure 172 is rotatable between the open and closed positions by a flexible drive 182 as shown in FIG. 9. Flexible drive 182 is in the form of a cable (in further embodiments any type of flexible drive could be suitable). A first end 183 of the flexible drive 182 is attached to the closure 172 and a second end 184 includes a driving boss 185. Adjacent second end 184 is a sleeve 186 having a flange 187. The sleeve 186 is fixed to the reservoir 118 by positioning the flange 187 inside of the reservoir, passing a cylindrical portion 188 of the sleeve 186 through a hole in the reservoir and securing the sleeve 186 in place by a circlip mounted on the outside of the reservoir. The flexible drive 182 is rotatable within the sleeve 186. The driving boss 185 engages with and is driven by actuator 174, which in this case is an electric motor. As best seen in FIGS. 6 and 7, the carrier 150 includes a recess 189 within which the actuator 174 sits.

The first end 183 of the flexible drive 182 rotates about axis A and the second end 184 rotates about axis B. The crown wheel rotates about axis C (FIG. 8) and the pinion rotates about axis D (FIG. 6). As will be appreciated, the closure 172 is positioned below axis C. The second end 184 is positioned above axis C. Axis B is substantially parallel to axis D. The actuator 174 is positioned above axis C.

Advantageously, the flexible drive 182 allows the closure 172 to be positioned towards the bottom of the reservoir and the actuator 174 to be positioned towards the top of the reservoir. In particular, the position of the actuator 174 is relatively high up on the carrier, and therefore less vulnerable to being damaged by rocks and the like thrown up from the road. Furthermore, the likelihood of damage to the actuator is lessened by positioning it within a recess of the carrier. The flexible drive 182 allows the actuator 174 to open and close the orifice 171 while being positioned remotely from the orifice 171. In particular, the flexible drive avoids the differential by passing over the top of the differential and then passing down the back of the differential. In this manner, the actuator can be positioned where it is less likely to be damaged, but nevertheless can drive a closure position towards the bottom of the reservoir.

Figure 10:
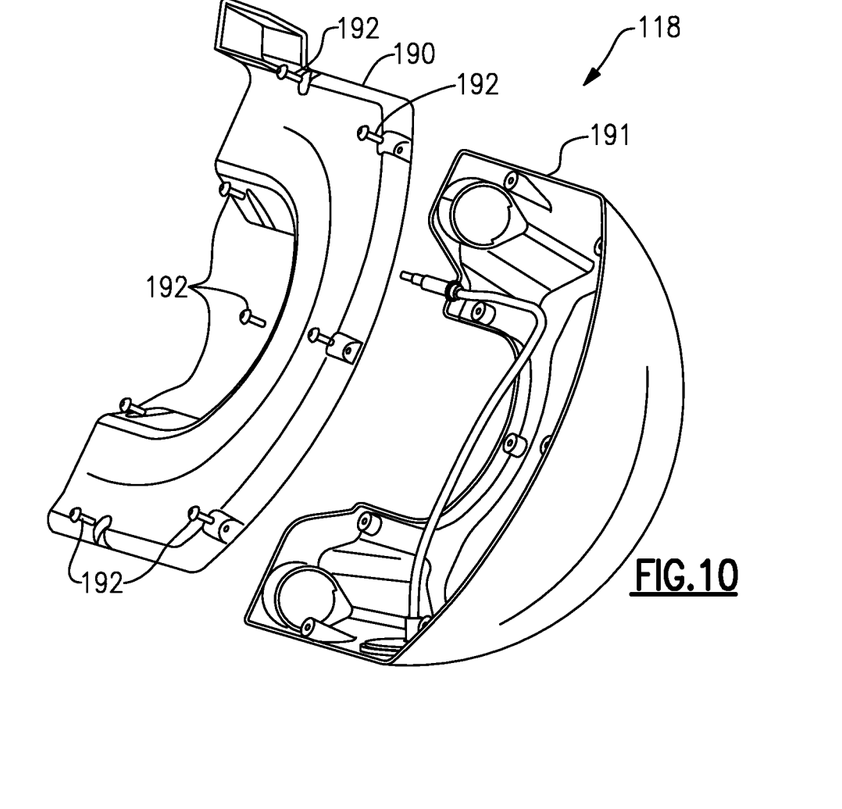
FIG. 10 is an exploded view of a reservoir from the embodiment shown in FIG. 6.

FIG. 10 shows an exploded view of the reservoir 118. In this case the reservoir is formed in two halves, molding 190 and molding 191. In this case the moldings 190 and 191 are made from a plastic material and are welded or otherwise fixed together. Pins 192 pass through holes in molding 190 into holes in molding 191 to locate the two moldings in their correct relative position either prior to welding or during gluing.

Figure 11:
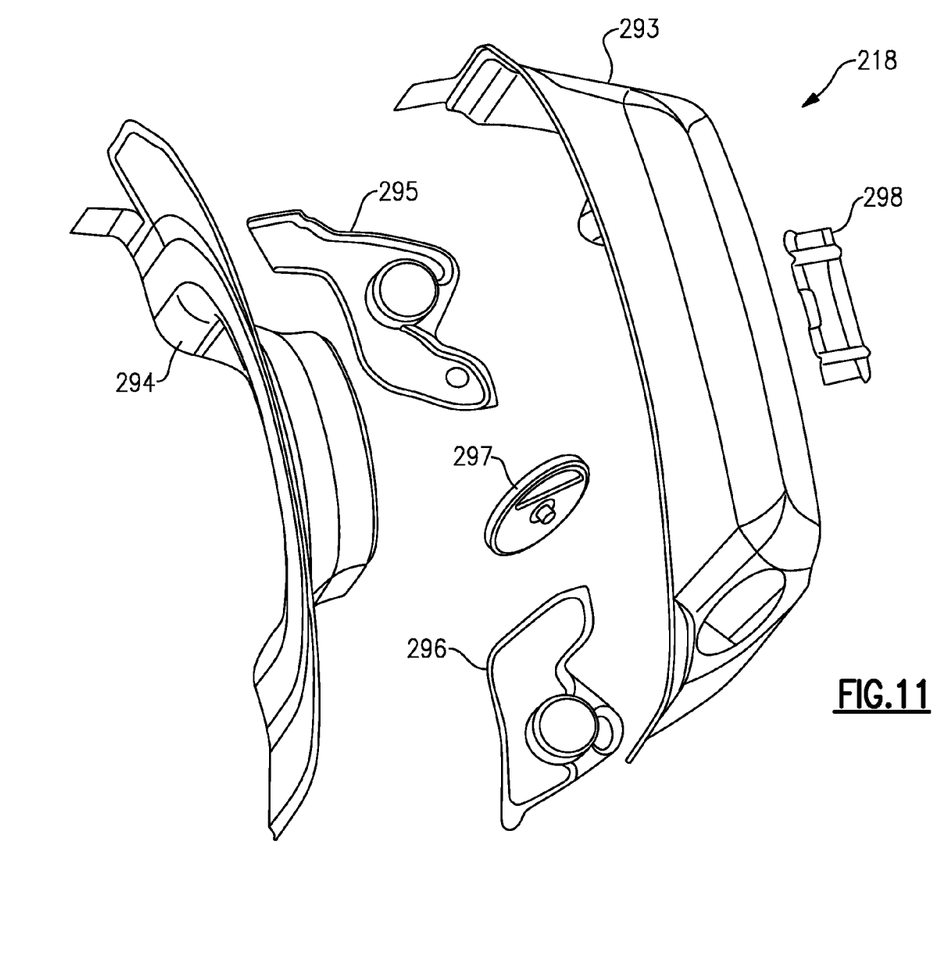
FIG. 11 shows another embodiment of a reservoir according to the present invention.

With reference to FIG. 11, there is shown an exploded view of an alternative reservoir 218. In this case the reservoir comprises four pressings 293, 294, 295 and 296. These four pressings together with boss 297 define the reservoir. Bracket 298 is attached to pressing 293 and is used to secure the reservoir 218 in place on the carrier via bolts equivalent to bolt 125.

The pressings, boss and bracket are welded together to form the complete reservoir assembly. In this case the pressings are made from steel.

In further embodiments, the reservoir can be made up of any number of components. The components can be pressings or moldings or a combination of pressings and moldings. The material for the pressings or moldings can be any suitable material, for example steel or a plastic material.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A transmission system including:
    an axle housing having a sump and an opening;
    a carrier upon which a crown wheel and pinion are mounted, the carrier having a flange sized to close the opening when the crown wheel and pinion are received in the housing; and
    a reservoir having an inlet system and an outlet system, rotation of the crown wheel causing lubricant to be transferred from the sump to the reservoir via the inlet system, and wherein the outlet system allows the lubricant to pass from the reservoir to the sump, the reservoir being mounted on the carrier.

2. The transmission system as defined in claim 1 wherein the reservoir is C-shaped.

3. The transmission system as defined in any claim 1 wherein the outlet system comprises an orifice and a closure moveable to vary an amount of lubricant flowing from the reservoir to the sump.

4. The transmission system as defined in claim 3 wherein the closure is linearly slideable.

5. The transmission system as defined in claim 3 wherein the closure is rotatable to close the orifice.

6. The transmission system as defined in claim 3 wherein the outlet system comprises an orifice and a closure moveable to vary an amount of lubricant flowing from the reservoir to the sump, and wherein the outlet system includes a permanent metered orifice in which the metered orifice is in the closure.

7. The transmission system as defined in claim 1 wherein the inlet system includes a scoop.

8. The transmission system as defined in claim 7 wherein the scoop is positioned at a top of the crown wheel.

9. The transmission system as defined in claim 8 wherein the opening is generally circular and includes an upper notch sized to receive the crown wheel, the scoop being positioned within the upper notch.

10. The transmission system as defined in claim 1 wherein the crown wheel includes crown wheel teeth defining a crown wheel tooth plane and the reservoir has a generally vertical wall facing the crown wheel teeth which defines a plane of the reservoir wall, the scoop projecting into a space defined between the crown wheel tooth plane and the plane of the reservoir wall.

11. The transmission system as defined in claim 1 wherein an amount of lubricant within the axle housing is greater than a capacity of the reservoir.

12. The transmission system as defined in claim 1 wherein the reservoir comprises at least two pressings or moldings attached together to define the reservoir.

13. The transmission system as defined in claim 5 wherein the closure is rotatable about a first axis by a flexible drive, the flexible drive having an end remote from the closure rotatable about a second axis, the first axis being different from the second axis.

14. The transmission system as defined in claim 13 wherein the second axis is substantially parallel to an axis of rotation of the pinion.

15. The transmission system as defined in claim 13 wherein the end is rotatable by an actuator.

16. A method of operating a transmission system wherein an axle housing has axle housing arms and includes lubricant, the method comprising the steps of:
    allowing an outlet system of a reservoir to equal a lubricant level in the reservoir and a sump; and
    operating the transmission system so the lubricant level in the reservoir rises above a level above an upper edge of the axle housing arm.

17. The method as defined in claim 16 wherein the lubricant is oil.

18. A method of operating a transmission system that includes lubricant, the method comprising the steps of:
    allowing an outlet system of a reservoir to equalize a lubricant level in the reservoir and a sump; and
    operating the transmission system to fill the reservoir.

19. A carrier subassembly including:
    a crown wheel;
    a pinion; and
    a reservoir, the reservoir having an inlet system and an outlet system, the reservoir being mounted on a carrier.

20. A method of assembling a carrier into a housing, the method including the steps of:
    providing a carrier subassembly defined by a pinion and a reservoir, the reservoir having an inlet system and an outlet system, the reservoir being mounted on the carrier;
    providing a housing having a sump and an opening, the carrier having a flange sized to close the opening; and
    inserting a crown wheel, pinion, and reservoir through the opening and attaching the flange to the housing to close the opening.

* * * * *